United States Patent [19]

Takahashi

[11] Patent Number: 5,318,496
[45] Date of Patent: Jun. 7, 1994

[54] METHOD AND APPARATUS FOR AUTOMATICALLY EXCHANGING A PUNCH FOR A TURRET PUNCH PRESS

[75] Inventor: Yutaka Takahashi, Placentia, Calif.

[73] Assignee: Amada Engineering and Service Co., Inc., La Mirada, Calif.

[21] Appl. No.: 47,281

[22] Filed: Apr. 19, 1993

[51] Int. Cl.⁵ .................................... B23Q 3/157
[52] U.S. Cl. ........................... 483/1; 483/29; 483/901
[58] Field of Search .............. 483/1, 28, 29, 901; 83/552, 503; 72/441, 442, 446; 901/10.9, 35, 41, 45

[56] References Cited

U.S. PATENT DOCUMENTS

| | | | |
|---|---|---|---|
| 3,984,006 | 10/1976 | Takeyasu et al. | 901/45 X |
| 4,359,815 | 11/1982 | Toyoda | 483/901 |
| 4,587,716 | 5/1986 | Bytow | 483/29 X |
| 4,904,911 | 2/1990 | Toyoda et al. | 901/9 |
| 5,215,513 | 6/1993 | Maynard et al. | 483/29 |

*Primary Examiner*—Z. R. Bilinsky
*Attorney, Agent, or Firm*—Sandler Greenblum & Bernstein

[57] ABSTRACT

In order to insert a punch into a punch mounting hole formed in a turret by a robot hand, the present method includes the following steps: (a) grasping the punch above the upper turret by a robot hand, and horizontally moving the punch to a position above a mounting hole formed in the upper turret; (b) moving the punch downwardly by the robot hand; (c) detecting whether the lower end of the punch is in contact with the wall of the mounting hole (d) detecting the height of the lower end of the punch when the lower end of the punch comes in contact with the wall of the mounting hole; (e) comparing the detected height of the lower end with a predetermined height; and (f) further moving the punch downwardly if the detected height is smaller than the predetermined height. In the preferred embodiment, if the insertion in accordance with the previous steps fails, the punch is moved upwardly and the center of the mounting hole is re-calculated on the basis of the data by a three-point search method.

5 Claims, 9 Drawing Sheets

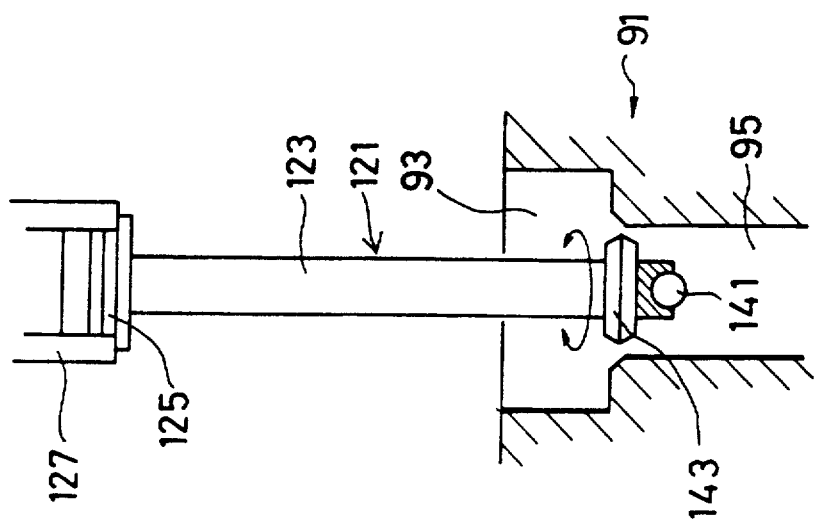
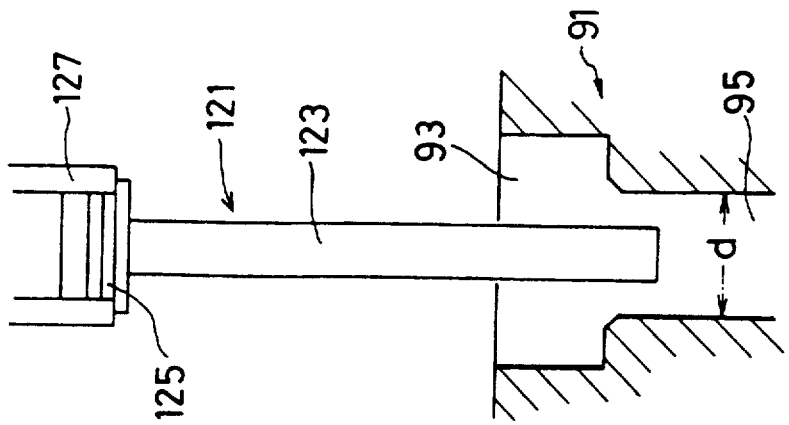

METHOD AND APPARATUS FOR AUTOMATICALLY EXCHANGING A PUNCH FOR A TURRET PUNCH PRESS

BACKGROUND OF THE INVENTION

1. Field of the Invention

The present invention relates to method and apparatus for automatically exchanging a punch for a turret punch press, and more particularly to method and apparatus for automatically exchanging a punch mounted on an upper turret of the turret punch press by a robot hand.

2. Description of the Prior Art

Conventionally, exchanging of a punch and a die mounted respectively on upper and lower turrets of a turret punch press are performed in various ways such as follows: (1) a block-like punch holder supporting a punch, and a block-like die holder supporting a die are loaded into and unloaded from the turret; (2) each punch and die is manually loaded into and unloaded from the turret.

The first method above requires holders for the punch and die. As a result, the punch press are costly to manufacture. Further, in the punch press in accordance with the first method, it is difficult to mount a large number of punches and dies on a turret because of the large dimensions of the punch and die holders. On the other hand, in the second method, operator are forced to perform troublesome operations, and working efficiency is decreased.

SUMMARY OF THE INVENTION

It is therefore an object of the invention to provide a method and apparatus for automatically exchanging a punch for a turret punch press by a robot hand.

According to the invention, a method and an apparatus are provided for automatically exchanging a punch for a turret punch press, in which a punch on an upper turret of the turret punch press is automatically exchanged. In particular, the method includes the following steps:

(a) grasping the punch above the upper turret by a robot hand provided, and horizontally moving the punch to a position above a mounting hole formed in the upper turret;
(b) moving the punch downwardly by the robot hand;
(c) detecting whether the lower end of the punch comes in contact with the wall of the mounting hole;
(d) detecting the height of the lower end of the punch when the lower end of the punch comes in contact with the wall of the mounting hole;
(e) comparing the detected height of the lower end with a predetermined height; and
(f) moving further the punch downwardly if the detected height is smaller than the predetermined height.

In the preferred embodiment, the method further includes the step of moving the punch upwardly if the detected height is larger than the predetermined height to determine a precise location of the center of the mounting hole.

In the preferred embodiment, when the insertion fail, the center of the mounting hole is re-calculated on the basis of the data from a detector which is provided on the punch exchange apparatus, and a trial of the aforesaid insertion is repeated.

With this arrangement of the present invention, a step of inserting the punch into the punch mounting hole is automated. Thus, the works of an operator during the exchange of the punch is simplified.

BRIEF DESCRIPTION OF THE DRAWINGS

FIG. 5A is a front elevation view showing a probe to be used in an embodiment of the present invention;

FIG. 5B is a view showing another embodiment of the probe;

DETAILED DESCRIPTION OF THE PREFERRED EMBODIMENTS

Figure 1:
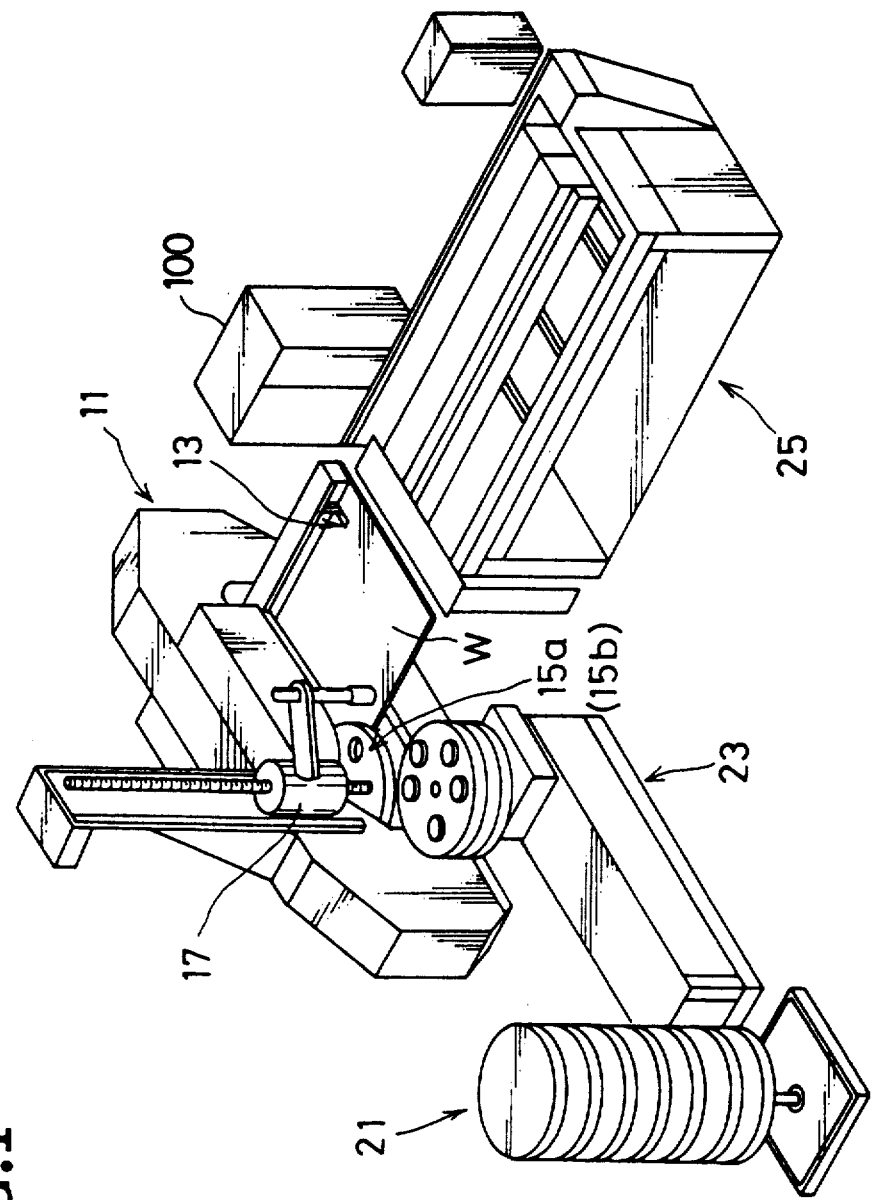
FIG. 1 is a schematic view showing a turret punch press to which an embodiment of the invention is applied.

Referring to FIG. 1, there is schematically shown the turret punch press to which an embodiment of the invention is applied. As shown in FIG. 1, a frame 11 is provided with a clamp 13 for grasping and moving a workpiece W, and a pair of upper and lower turrets 15a and 15b on which a punch and a die for punching the workpiece W are mounted, respectively. Further, the frame 11 is provided with a robot hand 17 for exchanging the punch on the upper turret 15a.

There are also provided, at a location adjacent to the frame 11, a punch tower 21 for storing punches to be exchanged, and a punch carrier 23 for selecting a required punch from the punch tower 21 and carrying the same to a suitable location adjacent to the turret 15a. In front of the frame 11 is a workpiece supply means 25 supplying the workpiece W. Selection and exchange of the punches between the punch tower 21 and the punch carrier 23 are effected by a suitable automatic selection and exchange apparatus (omitted in this description).

Figure 2:
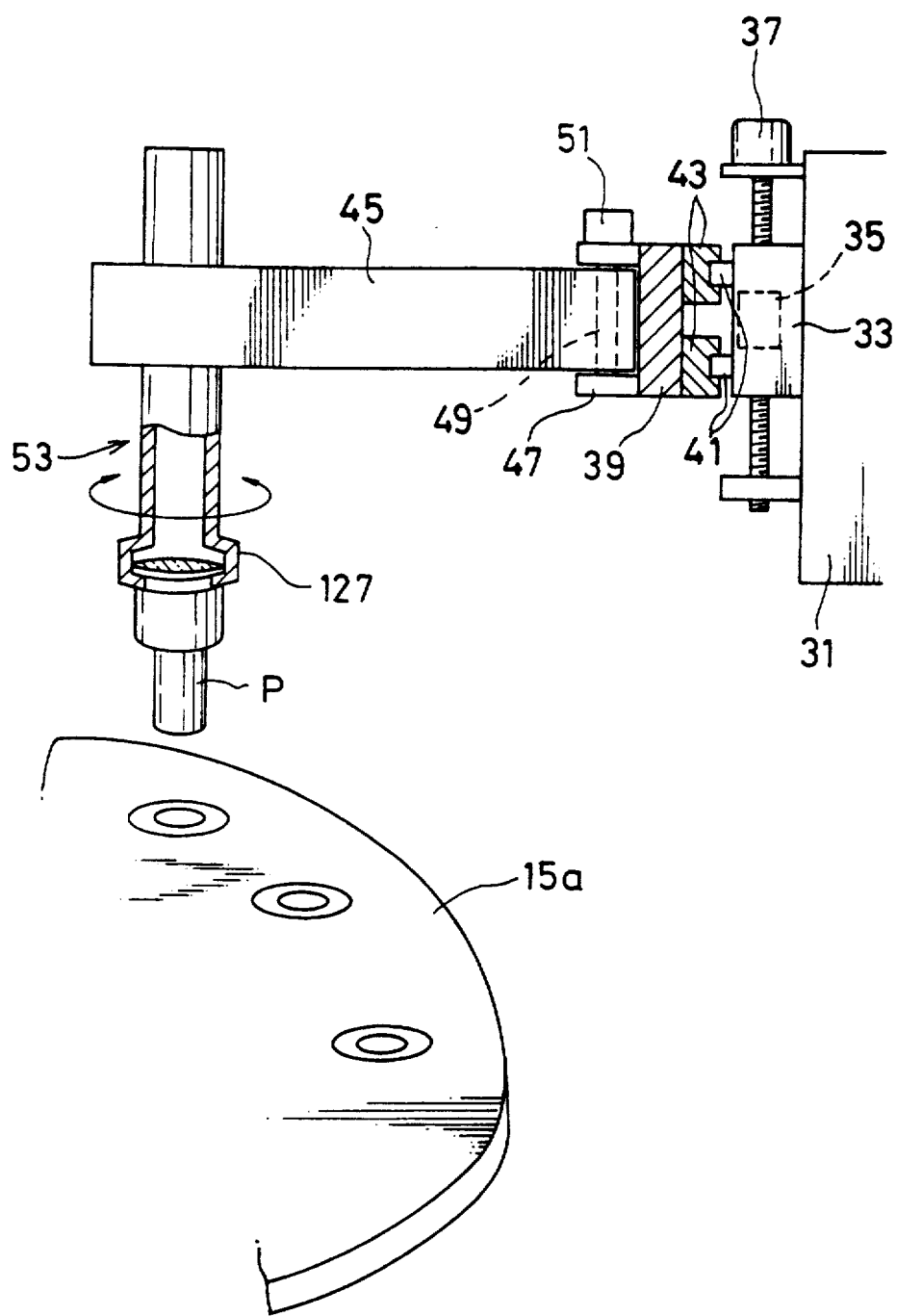
FIG. 2 is an explanatory view of a robot hand provided on the turret punch press.

FIG. 2 is a view showing the details of the robot hand 17. As shown in FIG. 2, a first slide element 33 extending in the longitudinal direction (perpendicular to the sheet of the drawing in FIG. 2) is mounted on a section 31 of the frame 11; the first slide element 33 is vertically slidable as shown in FIG. 2. The first slide element 33 is moved by a worm-gear system 35 and a motor 37 mounted on the section 31. The first slide element 33 is provided with a height detector (not shown) for measuring a height of the first slide element 33. Output data from the detector are stored in a memory of a computer 100 (see FIG. 1).

A pair of sliders 43 are supported for sliding in the longitudinal direction (perpendicular to the sheet of the drawing in FIG. 2) by a pair of longitudinal guide 41 fixed to the first slide element 33. A second slide element 39 is supported by the pair of sliders 43.

The second slide element 39 is moved in the longitudinal direction by a nut (not shown) fixed to the second slide member 39, a suitable ball screw (not shown) engaged with the nut and rotatably supported by the first slide element 33. A distance moved by the second slide element 39 is measured by a suitable position detector (not shown). Distance data from the position detector are stored in the memory of the computer 100.

A shaft 49 is pivotally supported by a support element 47 provided on the second slide element 39 at a location opposite to a slider 43. A pivotable arm 45 is fixed to the shaft 49. A motor 51 for pivoting the arm 45 is provided on the support element 47. Further, an angle detector (not shown) for measuring a pivoting angle of the arm 45 is provided at an adequate location. Measured data from the angle detector are stored in the aforesaid memory of the computer 100.

A hand 53 for grasping a punch P is rotatably provided at a lower end of the arm 45. Although not shown in the drawings, first and second pulleys are provided on the second slide element 39 and the shaft of the hand 53, respectively; a driving belt is also provided between the first and second pulley for coupling the first and second pulleys, as is described in detail in the co-pending patent application Ser. No. 07/958,778 by the same applicant (the contents of the co-pending application Ser. No. 07/958,778 is incorporated herein). Thus, in this arrangement, when the arm 45 is pivoted about the shaft 49, the hand 53 is in a parallel manner moved over the turret 15a without rotation relative to the turret 15a.

Figure 3:
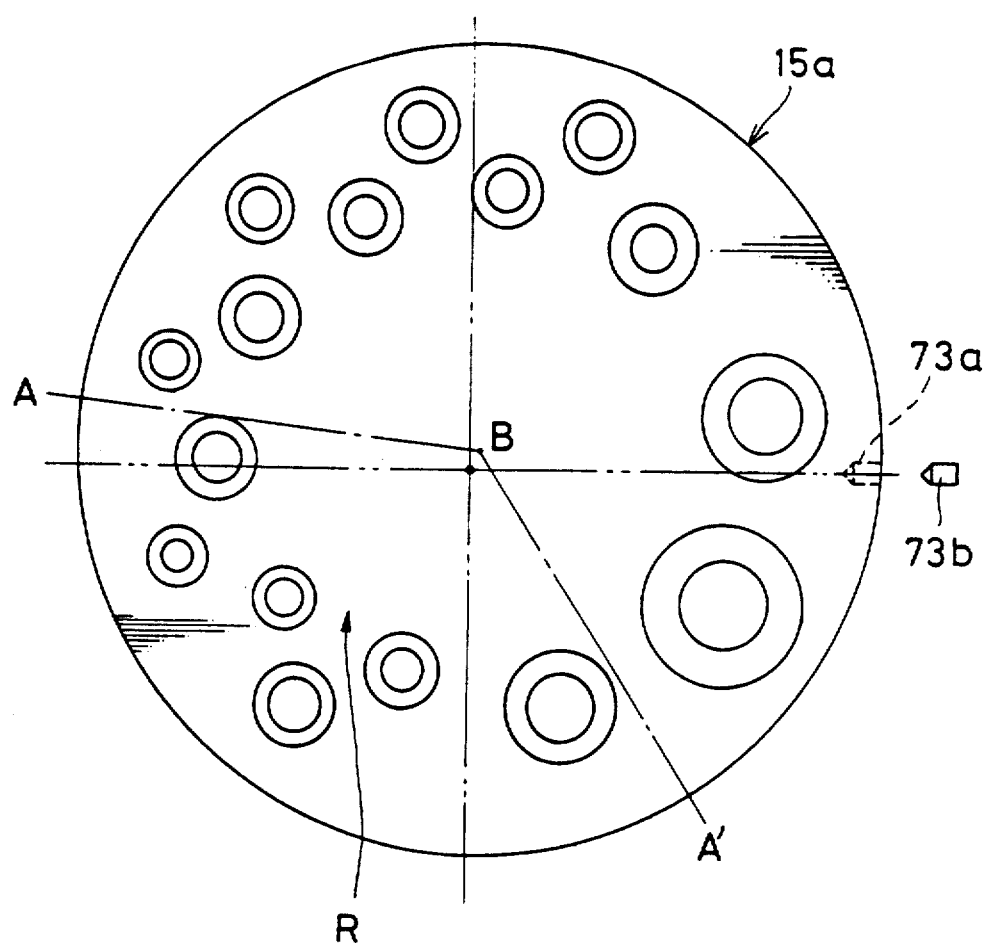
FIG. 3 is a plane view showing an upper turret of the turret punch press.

The hand 53 is supported by the arrangement described above, so that it is movable between a punch exchange region R on the turret, which is defined by lines A-B-A' as shown in FIG. 3, and the punch carrier 23 located at a punch exchange position.

As described above, the height and horizontal position of the hand 53 are measured by the aforesaid the height detector, the position detector, and the angle detector. These data are stored in the memory of the computer 100.

Moreover, the turret punch press is provided with means for detecting whether the punch P comes into contact with the surface of the upper turret. An example of this means includes unit for applying a voltage between the punch P and the upper turret, and a voltage meter for measuring a change in the voltage.

A method for mounting a punch P in the mounting hole on the upper turret 15a will be described in detail hereinafter.

FIG. 3 shows an example of the arrangement of the upper turret 15a. As shown in FIG. 3, the upper turret 15a is supported for rotation about its center. Moreover, the turret 15a is formed, at its peripheral section, with a pin hole 73a, into which a pin 73b provided on the frame 11 is inserted for indexing the turret 15a.

Figure 4:
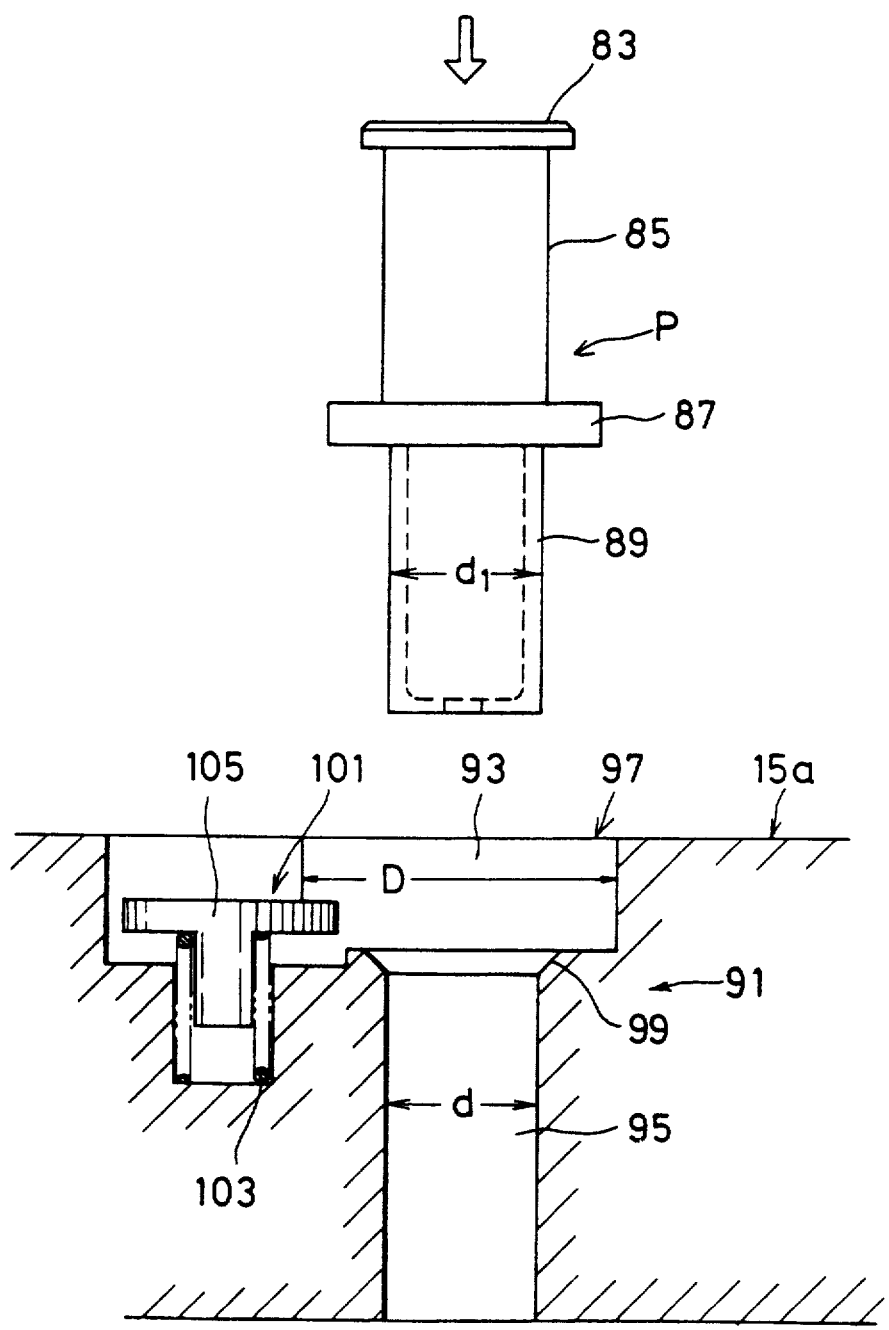
FIG. 4 is a cross-sectional view showing a punch, and a mounting hole formed in the upper turret.

FIG. 4 shows an example of the punch P, and a punch mounting hole 91 formed in the upper turret 15a. As shown in FIG. 4, the punch P includes a head section 83 to be hit by a striker of the punch press, a spring 85 for urging a punch body upward, a flange section 87, and a punch guide 89 for guiding the punch body.

The punch mounting hole 91 into which the punch P is inserted has an arrangement as follows. An upper hole 93 and a lower hole 95 are formed in the upper turret 15a; the diameter D of the upper hole 93 is dimensioned to be larger than that d of the lower hole 95. Also, the diameter d is dimensioned so as to be slightly larger than that d1 of the punch guide 89. At the upper end of the lower hole 95, there is provided a tapered section 99. In this arrangement, the flange section 87 and the punch guide 89 can be inserted into the upper hole 93 and the lower hole 95, respectively. A lifter 101 is provided at a plurality of positions (not shown) around the upper hole 93, for urging the punch P upward. Specifically, the lifter 101 includes a head element 105 adapted to be in contact with the lower surface of the flange section 87, and a spring 103 for urging the head element 105 upward.

A method of mounting the punch P into the punch mounting hole 91 will be described in detail hereinafter. The method of the mounting includes generally three steps: (1) Preliminary search effected by a suitable probe; (2) Main search effected by the hand grasping the punch; and (3) Actual mounting of the punch.

The preliminary search is for detecting positions and sizes of the punch mounting holes. This search is effected, for example, in case where the turret is exchanged. Indeed, the positions and the sizes of the punch mounting holes provided in a turret differ from those provided in another turret, and therefore when the turret is exchanged, positions and size of the punch mounting holes of a new turret should be detected and stored in the memory of the computer 100.

FIGS. 5A and 5B show examples of the probe for the preliminary search. As shown in FIG. 5A, the probe 121 has a probe body 123 and a grasping section 125. The prove body 123 consists of a bar, the diameter of which is sufficiently smaller than the diameter d of the lower hole 95, and preferably $\frac{1}{2} \sim \frac{1}{3}$ of the diameter of the smallest lower hole 95 among the lower holes formed in the turret. The grasping section 125 is adapted so that a grasping portion 127 of the robot hand 51 can accurately grasp that section 125. A predetermined electric voltage is applied between the probe 121 and the upper turret 15a, so that the contact between the prove 121 and the wall of the mounting hole is detected by the change in the voltage.

The probe 121 shown in FIG. 5B is another example of the probe for the preliminary search. This probe 121 includes a contact ring 143 and a conductive ball 141 both provided at the lower end of the prove body 123. The contact ring 143 is rotatable about a longitudinal axis of the probe body 123. The conductive ball 141 is provided at the bottom surface of the probe body 123 so as to rotate in any directions. With this ball, the probe 121 can move in any directions along the upper surface of the turret 15a while being in contact with the upper surface. Thus, the height and a diameter of the mounting hole 91 can be easily detected by causing the probe 121 to contact the walls of the holes.

Figure 6A:
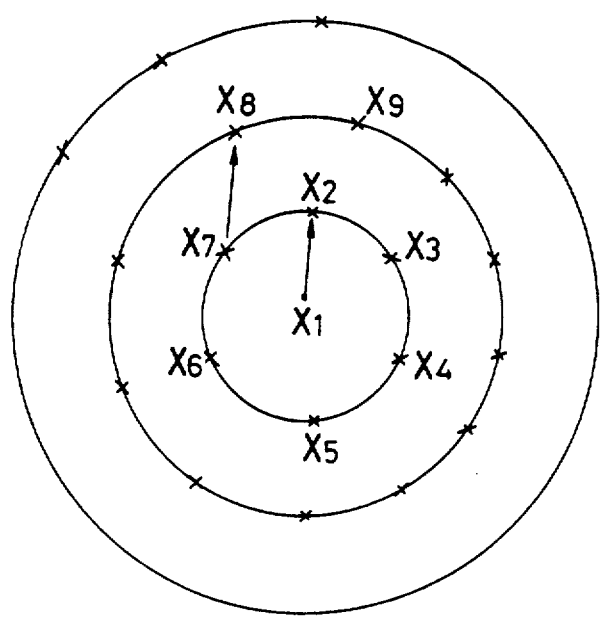
FIGS. 6A and 6B are views showing the first and second examples of the positions provided on the upper turret, for being searched in the embodiment of the present invention.
Figure 6B:
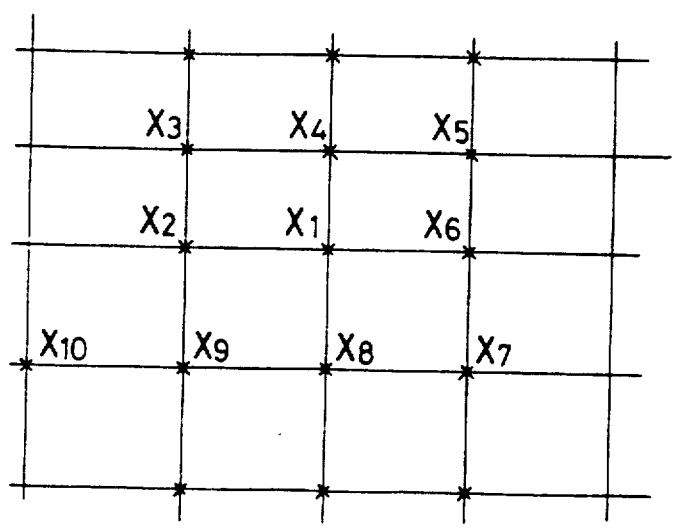

In the preliminary search, the location of the mounting hole 91 is first roughly detected. FIGS. 6A and 6B show two examples of such steps for the detecting the mounting hole 91. Locations of points to be tested on the turret are arranged with a suitable spacing therebetween, the spacing being determined in accordance with the diameter of the punch mounting hole 91. The test sequence is as follows: a mostly expected point $X_1$ is first tested. If the test is unsuccessful at the point X1, additional tests are made on successive points $X_2$, $X_3$, $X_4$... illustrated in FIGS. 6(A) and 6(B).

Once the location of the mounting hole is roughly detected, the center of the mounting hole and an inner diameter thereof are then precisely detected. For this purpose, the probe 121 is first moved horizontally to a point above the mounting hole 91 and moved downwardly. When the probe 121 comes in contact with the turret, a height of the robot arm is detected. If the height of the robot is equal to or lower than a predetermined level, it is judged that the lower end of the probe is inserted into the mounting hole 91. Then, a center and an inner diameter of the mounting hole 91 are calculated by a three-point search method as described in the following.

Figure 7:
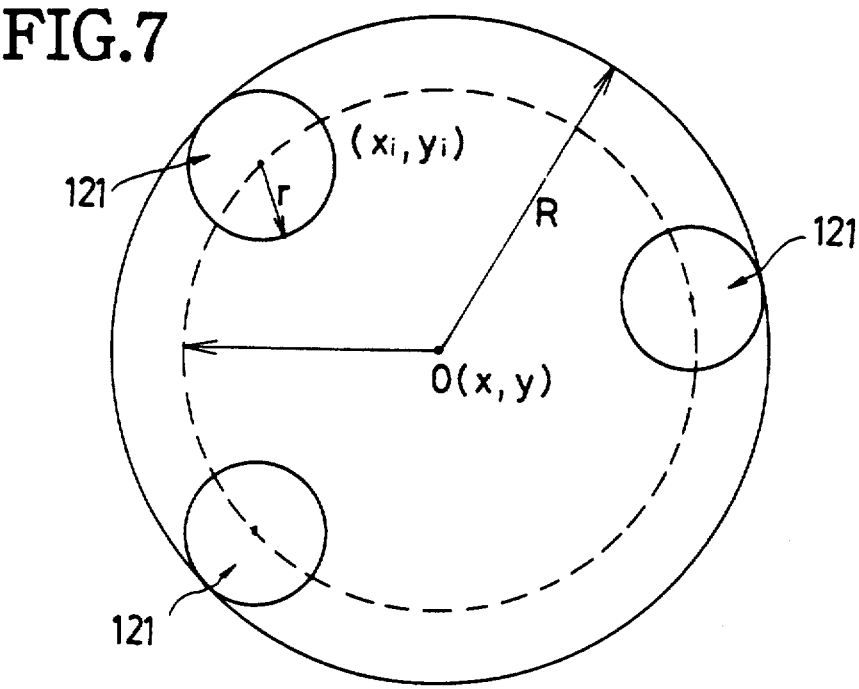
FIG. 7 is a view showing the principle of a three-point searching method in accordance with the embodiment of the present invention.

FIG. 7 is a schematic view showing the principle of the three-point method. It is assumed that the coordinates of the center O of the mounting holes is (X, Y) and a radius thereof is R, and the coordinates of the center of the probe 121 in contact with the wall of the mounting hole are $(x_i, y_i; i=1, 2, 3, \ldots N)$ and the radius thereof is r. Then, the central coordinates (X, Y) of the mounting hole and the radius (R) thereof are calculated by the formula:

$$(x_i - X)^2 + (y_i - Y)^2 = (R - r)^2, i = 1, 2, 3.$$

or $$\min_{X, Y, R} \left[ \sum_{i=1}^{N} \{(x_i - X)^2 + (y_i - Y)^2 - (R - r)^2\}^2 \right], (N \geq 4).$$

Specifically, the coordinates $(x_i, y_i)$ of the prove 121 in contact with the wall of the mounting hole 91 are stored in the memory of the computer 100. The coordinates (X, Y) of the center O and the radius R of the mounting hole 91 are calculated on the basis of the data above by the computer 100.

The data for the radius (R) and the center (X, Y) of each of the mounting holes thus calculated are stored in the memory of the computer 100. On the basis of such data, punch exchange is effected by the robot hand 53.

Referring to FIGS. 8–11, 12A, and 12B, the insertion of the punch P into the mounting hole 91 will be described hereinafter in detail. It is to be noted that since the difference $(d-d_1)$ between the diameter d of the punch mounting hole 91 and the diameter d1 of the punch P is very small, such insertion of the punch P is a hard task for the robot hand 53.

Figure 8:
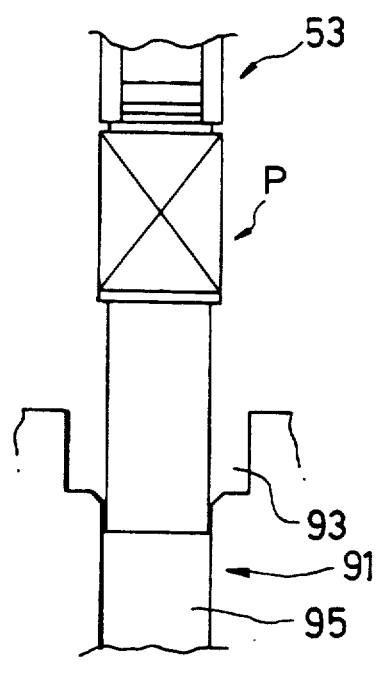
FIG. 8 is a view showing the case where the punch is inserted into the mounting hole without repositioning thereof.

FIG. 8 show the mounting hole 91 and the punch P in the case where the punch P is positioned substantially just above the lower hole 95 of the mounting hole 91. In this case, while the punch P is being moved downward, it is detected whether the lower end of the punch P comes in contact with the wall of the mounting hole 91. When the lower end of the punch comes in contact with the wall of the mounting hole, the height of the lower end of the punch is detected. The computer 100 compares the detected height of the lower end of the punch P with a predetermined height stored therein previously. Then, if the detected height is smaller than the predetermined height, the punch P is further moved downwardly so as to be completely inserted in the lower hole 95.

Figure 9:
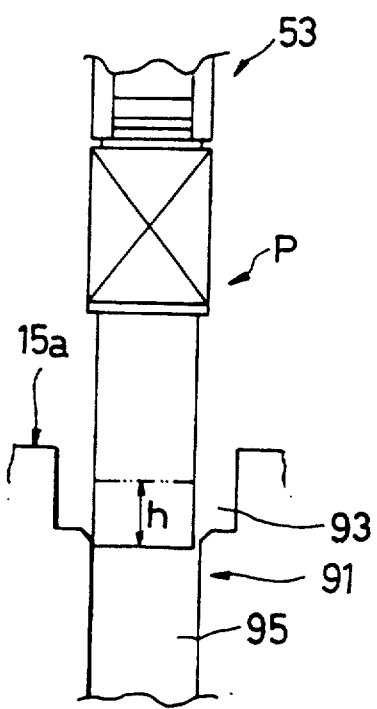
FIG. 9 is a view showing the case where an early contact of the punch with the wall of the mounting hole occurs during mounting steps of the punch.

In the case shown in FIG. 9, during the insertion, the lower end of the punch P comes in contact with an upper section of the inner wall of lower hole 95. In this case, the punch P is moved upward, by a distance h, for example, to a predetermined height, which is still lower than that of the upper surface 15a of the turret so that the lower end of the punch P is in the upper hole 93 of the mounting hole 91. Then, the three-point search method that has been described above in connection with the preliminary search by the probe 121 (see FIG. 7), is effected so that the center of the upper hole 93 is again detected on the basis of the data by the three point search Now, it is assumed that the center axis of the lower hole 95 is precisely aligned with that of the upper hole 93. Upon this assumption, the punch P is again tried to be inserted into the lower hole 95.

Figure 10:
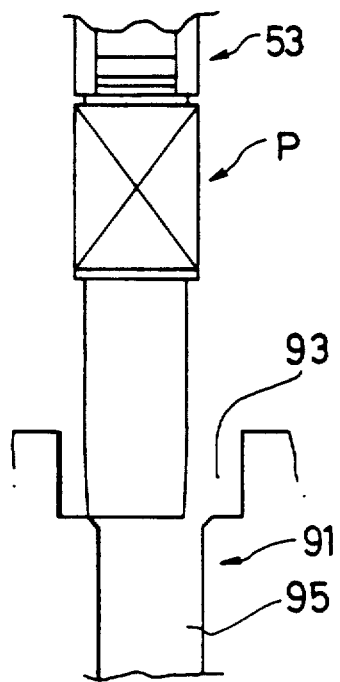
FIG. 10 is a view showing the case where the punch comes in contact with a seat of the mounting hole.

In the case shown in FIG. 10, the punch P is inserted into the upper hole 93 having a large diameter, but not into the lower hole 95 having a small diameter. Here, the three-point search is again used; on the basis of the search, the punch P is inserted into the mounting hole 91.

Figure 11:
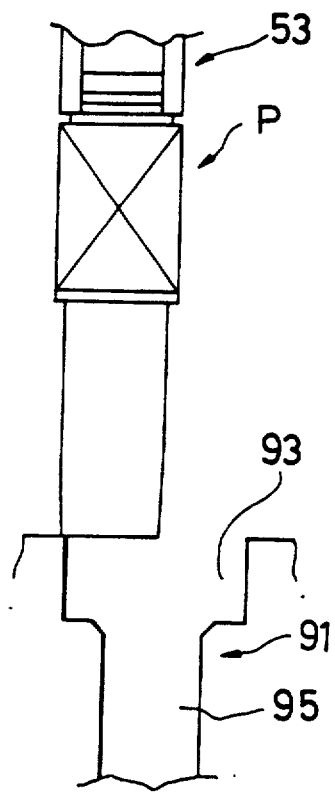
FIG. 11 is a view showing the case where the punch comes in contact with a upper surface of an upper turret.
Figure 12A:
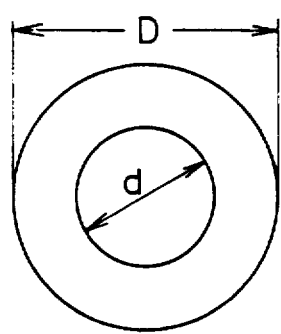
FIGS. 12A and 12b are views showing an example of a fuzzy search.
Figure 12B:
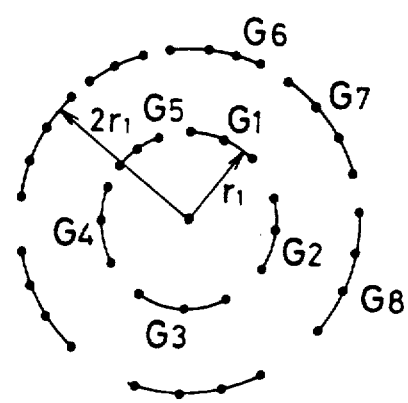

In the case shown in FIG. 11, the punch P is not be inserted even into the upper hole 93. In this case, a fuzzy search is effected as follows. FIGS. 12A and 12B are schematic views showing an example of the method of the fuzzy search. A plurality of trial points are set on circles having radii $r_1, r_2, \ldots$ which are determined in accordance with the diameter D of the upper hole 93 and the diameter d of the lower hole 95. The trial points are classified into several groups each including a plurality of points that are successively tried for insertion of the punch P. Further, fuzzy numbers are assigned respectively to the groups; the fuzzy numbers assigned to the groups form a fuzzy function. Here, the fuzzy numbers are assigned to the groups by taking account of possible inclination (such as toward right) of punch P grasped by the robot arm 53. The fuzzy number may be changed by an instruction of the computer 100 having learning function. Further, it is to be noted that the number of the trial points in each group G1, G2, G3, ... could be one, rather than plural.

The fuzzy search is effected as follows. The groups are checked in the order of the fuzzy number assigned thereto; if the lower hole 95 is not located at the points of the group, the fuzzy number of this group is reset to zero. In this way, the trials are repeated. In the present embodiment, the following relationship is adopted:

$$r_1 < 0.5 (D-d), r_2 = 2r_1, r_3 = 3r_1 \ldots$$

Figure 13:
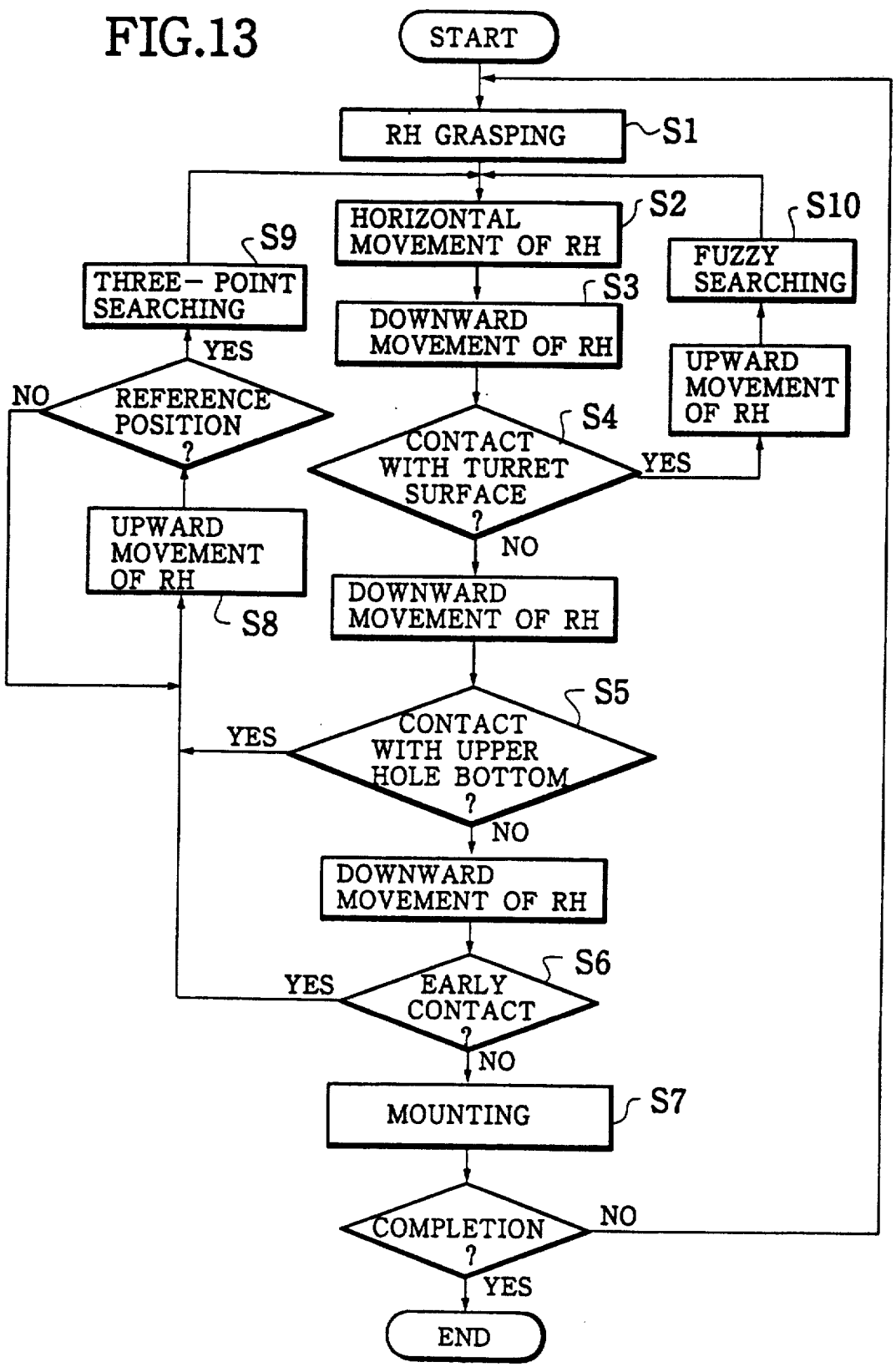
FIG. 13 is a flow chart showing overall steps for mounting a punch into a mounting hole in accordance with the present invention.

FIG. 13 is a flow chart showing overall steps for inserting the punch P into the mounting hole 51. At Step S1, the punch P is grasped by the robot hand (RH). At Step S2, the robot hand is moved horizontally to a location above a trial point. At Step 3, the robot hand is moved downwardly. At Step S4, it is judged whether the punch comes in contact with the upper surface of the turret. At Step S5, it is judged whether the punch comes in contact with the bottom of the upper hole. At Step S6, it is judged whether the punch comes in contact with a wall of the lower hole prior to reaching to a predetermined height. At Step S7, grasping of the punch is released. At Step S8, the robot hand is moved upwardly to a predetermined reference position while grasping the punch. At Step S9, a center of the mounting hole is calculated by the three-point search method. At Step S10, the fuzzy search method is used to determine a next trial point.

What is claimed is:

1. A method for automatically exchanging a punch for a turret punch press, comprising the steps of:
   (a) grasping the punch above the upper turret by a robot hand provided, and horizontally moving the punch to a position above a mounting hole formed in the upper turret;
   (b) moving the punch downwardly by the robot hand;
   (c) detecting whether the lower end of the punch comes in contact with the wall of the mounting hole;
   (d) detecting the height of the lower end of the punch when the lower end of the punch comes in contact with the wall of the mounting hole;
   (e) comparing the detected height of the lower end with a predetermined height; and
   (f) further moving the punch downwardly if the detected height is smaller than the predetermined height.

2. The method of claim 1, further comprising the steps of:
   (i) detecting whether the lower end of the punch comes in contact with the upper surface of the turret; and
   (ii) detecting the center of the punch mounting hole by a fuzzy search method if the lower end of the punch comes in contact with the surface of the upper turret.

3. The method of claim 1, wherein the mounting hole includes an upper hole with a large diameter and a lower hole with a small diameter, the method further comprising the step of:
   (iii) if the detected height is smaller than the predetermined height as a result of the comparison at the step (e), moving the punch upwardly by a predetermined distance;
   (iv) causing the punch to come in contact with at least three sections of a wall of the upper hole;
   (v) detecting the positions of the punch when the punch is in contact with a section of the wall of the upper hole; and
   (vi) calculating a center of the lower hole from the positions of the punch which is in contact with the section of the wall of the upper hole.

4. A method of claim 1, further comprising the step of: detecting a position and a diameter of the mounting hole by a probe prior to the step (a).

5. An apparatus for automatically exchanging a punch for a turret punch press, the turret punch press having an upper turret for supporting the punch, comprising:
   robot hand for grasping the punch, the robot hand being adapted to horizontally move the punch to a position above a mounting hole formed in the upper turret, and to move the punch downwardly;
   means for detecting whether the lower end of the punch comes in contact with the wall of the mounting hole
   means for detecting the height of the lower end of the punch when the lower end of the punch comes in contact with the wall of the mounting hole;
   means for comparing the detected height of the lower end with a predetermined height; and
   means for causing the robot hand to move downwardly if the detected height is smaller than the predetermined height.

* * * * *